United States Patent
Li

(10) Patent No.: US 12,302,347 B2
(45) Date of Patent: May 13, 2025

(54) PDCCH CONFIGURATION METHOD AND TERMINAL

(71) Applicant: VIVO MOBILE COMMUNICATION CO., LTD., Dongguan (CN)

(72) Inventor: Gen Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 362 days.

(21) Appl. No.: 17/861,141

(22) Filed: Jul. 8, 2022

(65) Prior Publication Data

US 2022/0346073 A1   Oct. 27, 2022

Related U.S. Application Data

(63) Continuation of application No. PCT/CN2021/070067, filed on Jan. 4, 2021.

(30) Foreign Application Priority Data

Jan. 9, 2020   (CN) .................... 202010023927.2

(51) Int. Cl.
*H04W 72/044* (2023.01)
*H04W 24/08* (2009.01)
*H04W 72/23* (2023.01)

(52) U.S. Cl.
CPC ........... *H04W 72/23* (2023.01); *H04W 24/08* (2013.01)

(58) Field of Classification Search
CPC ..... H04W 72/23; H04W 24/08; H04W 48/12; H04L 5/007; H04L 5/0051
See application file for complete search history.

(56) References Cited

U.S. PATENT DOCUMENTS

2018/0220414 A1   8/2018   Yin et al.
2020/0045676 A1*  2/2020   Ryu ................ H04L 5/001
(Continued)

FOREIGN PATENT DOCUMENTS

| CN | 109391971 A | 2/2019 |
|---|---|---|
| CN | 109691206 A | 4/2019 |

(Continued)

OTHER PUBLICATIONS

3GPP TSG-RAN WG2#99, R2-1707694 Title:Cell quality in te hmeasurment reaport (Year: 2017).*
(Continued)

*Primary Examiner* — Christopher M Crutchfield
*Assistant Examiner* — Abusayeed M Haque
(74) *Attorney, Agent, or Firm* — IPX PLLC

(57) ABSTRACT

A physical downlink control channel (PDCCH) configuration method and a terminal are provided. The PDCCH configuration method includes: receiving a PDCCH search space configuration, where the PDCCH search space configuration is associated with M control resource sets (coresets) and N time-domain monitoring positions; forming L PDCCH search subspaces based on the M coresets and the N time-domain monitoring positions, where one PDCCH search subspace includes one coreset and one time-domain monitoring position; and receiving a PDCCH in the L PDCCH search subspaces; where M and N are both integers greater than or equal to 1, and L is an integer greater than 1.

15 Claims, 3 Drawing Sheets

(56) References Cited

U.S. PATENT DOCUMENTS

| | | | |
|---|---|---|---|
| 2020/0092073 A1* | 3/2020 | Papasakellariou | ............................ H04W 72/0446 |
| 2020/0229270 A1* | 7/2020 | Chatterjee | ............. H04L 5/0092 |
| 2021/0135734 A1* | 5/2021 | Abedini | ............... H04B 7/0695 |
| 2021/0409182 A1* | 12/2021 | Lee | ....................... H04L 5/0055 |
| 2022/0006570 A1* | 1/2022 | Lee | .................... H04W 72/543 |
| 2022/0078765 A1* | 3/2022 | Kim | ........................ H04L 1/00 |

FOREIGN PATENT DOCUMENTS

| | | |
|---|---|---|
| CN | 110475262 A | 11/2019 |
| KR | 20190017675 A | 2/2019 |
| WO | 2019069212 A1 | 4/2019 |

OTHER PUBLICATIONS

3GPP TSG RAN WG1 Meeting3#90, R1-1712442 Title:Search Space Design for NR-PDCCH (Year: 2017).*
3GPP TSG-RAN WG2#99, R2-1707694 Title:Cell quality in the measurment reaport (Year: 2017).*
Extended European Search Report issued in related European Application No. 21738436.1, mailed Jun. 5, 2023, 10 pages.
NTT COCOMO et al. "Vles on control resource set configuration for NR-PDCCH" 3GPP TSG RAN WG1 NR Ad-Hoc#2, R1-1711090, Jun. 2017, 4 pages.
International Search Report issued in corresponding International Application No. PCT/CN2021/070067, mailed Mar. 12, 2021, 4 pages.

\* cited by examiner

PDCCH CONFIGURATION METHOD AND TERMINAL

CROSS-REFERENCE TO RELATED APPLICATIONS

This application is a continuation of International Application No. PCT/CN2021/070067, filed on Jan. 4, 2021, which claims priority to Chinese Patent Application No. 202010023927.2, filed in China on Jan. 9, 2020. The entire contents of each of the above-referenced applications are expressly incorporated herein by reference.

TECHNICAL FIELD

The present disclosure relates to the field of communications technologies, and in particular, to a PDCCH configuration method and a terminal.

BACKGROUND

In some communications systems (for example, a 5G communications system), scheduling information and other control information are mainly carried through a physical downlink control channel (PDCCH). At present, in the 5G system, if new radio (NR) operates in high frequency bands (such as 57 GHz to 71 GHz) and supports large bandwidth carriers, a larger subcarrier spacing (SCS) needs to be introduced to reduce a required Fast Fourier Transformation (FFT) size. However, if the SCS of the NR system is increased, a length of each symbol resource element group (REG) is reduced; if the maximum number of symbols that can be configured in the control resource set (coreset) remains unchanged, an absolute time is greatly reduced, thereby affecting PDCCH transmission performance. This also decreases PDCCH reception performance of terminals.

SUMMARY

Embodiments of the present disclosure provide a PDCCH configuration method and a terminal.

The present disclosure is implemented as follows:

According to a first aspect, an embodiment of the present disclosure provides a PDCCH configuration method, applied to a terminal, where the method includes:

receiving a PDCCH search space configuration, where the PDCCH search space configuration is associated with M control resource sets coresets and N time-domain monitoring positions:

forming L PDCCH search subspaces based on the M coresets and the N time-domain monitoring positions, where one PDCCH search subspace includes one coreset and one time-domain monitoring position; and receiving a PDCCH in the L PDCCH search subspaces; where M and N are both integers greater than or equal to 1, and L is an integer greater than 1.

According to a second aspect, an embodiment of the present disclosure further provides a terminal, including:

a first receiving module, configured to receive a PDCCH search space configuration, where the PDCCH search space configuration is associated with M control resource sets coresets and N time-domain monitoring positions;

a forming module, configured to form L PDCCH search subspaces based on the M coresets and the N time-domain monitoring positions, where one PDCCH search subspace includes one coreset and one time-domain monitoring position; and a second receiving module, configured to receive a PDCCH in the L PDCCH search subspaces; where M and N are both integers greater than or equal to 1, and L is an integer greater than 1.

According to a third aspect, an embodiment of the present disclosure further provides a terminal, including a processor, a memory, and a computer program stored in the memory and capable of running on the processor, where when the computer program is executed by the processor, the steps of the PDCCH configuration method according to the first aspect are implemented.

According to a fourth aspect, an embodiment of this disclosure further provides a computer-readable storage medium, where a computer program is stored in the computer-readable storage medium. When the computer program is executed by a processor, the steps of the PDCCH configuration method according to the first aspect are implemented.

In the embodiments of the present disclosure, after receiving the PDCCH search space configuration, the terminal can form the L PDCCH search subspaces based on the M coresets and the N time-domain monitoring positions, and receive the PDCCH in the L PDCCH search subspaces: where both M and N are integers greater than or equal to 1, and L is an integer greater than 1. In this way, at least one coreset and at least one time-domain monitoring position are associated with the PDCCH search space configuration, and at least two PDCCH search subspaces can be formed, so that the terminal can perform PDCCH reception on the at least two PDCCH search subspaces, thereby improving PDCCH transmission performance and further improving PDCCH reception performance of terminals.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
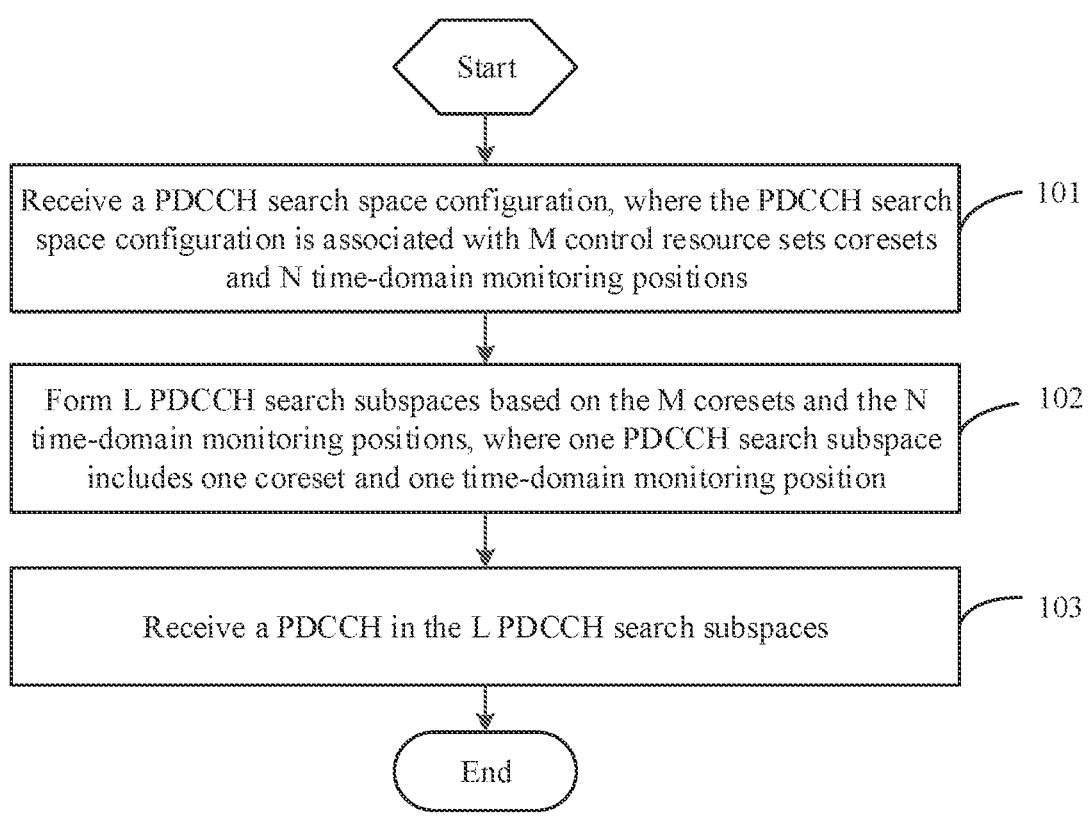
FIG. 1 is a flowchart of a PDCCH configuration method according to an embodiment of the present disclosure.

An embodiment of the present disclosure provides a PDCCH configuration method, and the PDCCH configuration method is applied to a terminal. Referring to FIG. 1, the PDCCH configuration method includes the following steps:

Step 101: Receive a PDCCH search space configuration, where the PDCCH search space configuration is associated with M control resource sets coresets and N time-domain monitoring positions.

It should be noted that the PDCCH search space configuration may be configuration information corresponding to a PDCCH search space. For example, in NR Rel 15, the PDCCH search space configuration includes time-domain configuration information (for example, monitoring periodicity, slot offset, slot count, symbol position, and control resource set index), frequency-domain configuration information, and the like. Generally, the PDCCH search space configuration is associated with one coreset and one time-domain monitoring position, so as to determine the time-domain configuration information and frequency-domain configuration information of the PDCCH search space.

In this embodiment of the present disclosure, both M and N are integers greater than 1 or equal to 1, that is, the PDCCH search space configuration received by the terminal is associated with at least one coreset and at least one time-domain monitoring position.

In some embodiments, a quantity of the M coresets may be determined based on at least one of the following three schemes:

Scheme 1: The PDCCH search space configuration includes a coreset group, and the coreset group includes M coreset IDs.

It should be noted that different coreset IDs correspond to different coresets, and the M coreset IDs included in the coreset group correspond to M coresets, so as to determine that the PDCCH search space configuration received by the terminal is associated with M different coresets, or associated with M independent coresets.

Scheme 2: The PDCCH search space configuration is associated with one coreset ID and includes M active transmission configuration indicator (TCI) state parameters.

For example, the M coresets may be obtained based on one independently configured coreset and M TCI state parameters included in a coreset configuration. In this scheme, only one coreset ID is associated with the PDCCH search space configuration, but the coreset configuration includes M active TCI state parameters. In this case, it may be considered that the PDCCH search space configuration includes M coresets, the M coresets are different only in TCI state parameters, with all other parameters (such as frequency-domain position, interleaving configuration, precoding cycling configuration, and Aggregation parameter configuration) being the same.

Scheme 3: The PDCCH search space configuration is associated with one coreset ID and includes M frequency-domain positions.

For example, the M coresets may be obtained based on one independently configured coreset and M frequency-domain positions included in a coreset configuration. The M frequency-domain positions may be obtained based on a plurality of independent physical resource block (PRB) configurations, and/or based on one independent PRB configuration and a plurality of frequency-domain offsets. In this scheme, it can be considered that the PDCCH search space configuration includes M coresets, and the M coresets may be different only in frequency-domain position, with all other parameters being the same.

In addition, the M coresets may alternatively be obtained by combining the foregoing schemes, that is, the PDCCH search space configuration is associated with I coreset IDs, the i-th (i=0, 1, . . . , I−1) coreset includes $U_i$ TCI state parameters or $V_i$ frequency-domain positions, and sum($U_i$)=M.

In some embodiments, a quantity of the N time-domain monitoring positions may be determined based on at least one of the following two schemes:

Scheme 1: The PDCCH search space configuration includes N independently configured time-domain monitoring positions.

For example, the PDCCH search space configuration received by the terminal is associated with N independently configured time-domain monitoring positions, for example, being associated with three time-domain monitoring positions, that is, N=3.

Scheme 2: The PDCCH search space configuration includes one independently configured time-domain monitoring position and N or N−1 time-domain offset groups.

In this scheme, the PDCCH search space configuration received by the terminal includes one independently configured time-domain monitoring position and N or N−1 time-domain offset groups. In this case, it can be considered that the PDCCH search space configuration includes N time-domain monitoring positions. Time-domain offsets corresponding to the N time-domain monitoring positions are determined based on the time-domain offset groups and a time-domain offset of the independently configured time-domain monitoring position.

In addition, the N time-domain monitoring positions may alternatively be obtained by combining the foregoing schemes, that is, J independently configured time-domain monitoring positions are included in the PDCCH search space configuration, and the j-th (j=0, 1, . . . , J−1) independently configured time-domain monitoring positions includes $W_j$ or $W_j−1$ offsets, and sum($W_j$)=N.

Step 102: Form L PDCCH search subspaces based on the M coresets and the N time-domain monitoring positions, where one PDCCH search subspace includes one coreset and one time-domain monitoring position.

M and N are both integers greater than or equal to 1, and L is an integer greater than 1. For example, the terminal can form at least two PDCCH search subspaces based on the received PDCCH search space configuration, and each PDCCH search subspace includes one coreset and one time-domain monitoring position.

In this embodiment of the present disclosure, M?1, and N>1. The terminal may perform spreading and mapping based on values of M and N, or perform only mapping, to form the L PDCCH search subspaces. The following uses several exemplary implementations for description.

In implementation 1, M and N are both integers greater than 1, and the step 102 may include:

performing mapping on the M coresets and the N time-domain monitoring positions to form the L PDCCH search subspaces.

For example, the number of coresets and that of time-domain monitoring positions associated with the PDCCH search space configuration received by the terminal are the same. For example, if M=N=2, the terminal may form two PDCCH search subspaces, that is, M=N=L: and during forming of the PDCCH search subspaces, the terminal performs mapping on the two coresets and two time-domain monitoring positions. In other words, one coreset corresponds to one time-domain monitoring position.

Alternatively, M=N=2, and the terminal may form four PDCCH search subspaces, that is, L=M×N. For example, the PDCCH search space configuration is associated with a first coreset, a second coreset, a first time-domain monitoring position, and a second time-domain monitoring position. Mapping may be performed on the first coreset, the first time-domain monitoring position, and the second time-domain monitoring position to obtain two PDCCH search subspaces; or mapping may be performed on the second coreset, the first time-domain monitoring position, and the second time-domain monitoring position to obtain the other two PDCCH search subspaces.

In implementation 2, M and N are both integers greater than 1, and step 102 may further include:

performing spreading and mapping on the M coresets and/or the N time-domain monitoring positions to form the L PDCCH search subspaces, where M=L or N=L.

It can be understood that this implementation may include the following schemes.

Scheme 1: Perform spreading on the M coresets, and perform mapping on coresets obtained through spreading and the N time-domain monitoring positions to form the L PDCCH search subspaces, where N=L.

For example, M=3, and N=6, that is, three coresets and six time-domain monitoring positions are associated with the PDCCH search space configuration. The terminal may separately perform spreading on the three coresets to obtain six coresets, and then perform mapping on the six coresets obtained through spreading and the six time-domain monitoring positions associated with the PDCCH search space configuration, so that the six coresets are in one-to-one correspondence to the six time-domain monitoring positions, to form six PDCCH search subspaces.

Alternatively, the terminal performs spreading on the M coresets to obtain T coresets, and the number of PDCCH search subspaces is L=T×N. In this way, more PDCCH search subspaces can be formed.

Scheme 2: Perform spreading on the N time-domain monitoring positions, and perform mapping on time-domain monitoring positions obtained through spreading and the M coresets to form the L PDCCH search subspaces, where M=L.

For example, M=6, and N=3, that is, six coresets and three time-domain monitoring positions are associated with the PDCCH search space configuration. The terminal may separately perform spreading on the three time-domain monitoring positions to obtain six time-domain monitoring positions, and then perform mapping on the six time-domain monitoring positions obtained through spreading and the six coresets associated with the PDCCH search space configuration, so that the six coresets are in one-to-one correspondence to the six time-domain monitoring positions, to form six PDCCH search subspaces.

Alternatively, the terminal performs spreading on the N time-domain monitoring positions to obtain R time-domain monitoring positions, and the number of PDCCH search subspaces is L=M×R.

Scheme 3: Perform spreading on the M coresets, perform spreading on the N time-domain monitoring positions, and perform mapping on coresets and time-domain monitoring positions obtained through spreading, to form the L PDCCH search subspaces.

For example, M=3, and N=3, that is, three coresets and three time-domain monitoring positions are associated with the PDCCH search space configuration. The terminal may separately perform spreading on the three coresets and the three time-domain monitoring positions to obtain six coresets and six time-domain monitoring positions respectively, and then perform mapping on the six coresets and six time-domain monitoring positions obtained through spreading, to form six PDCCH search subspaces.

Alternatively, the terminal performs spreading on the M coresets to obtain T coresets, and then performs spreading on the N time-domain monitoring positions to obtain R time-domain monitoring positions, and the number of PDCCH search subspaces is L=T×R.

In implementation 3, M is an integer greater than 1, N=1, and the time-domain monitoring position is a first time-domain monitoring position; and the step 102 may include:

performing spreading on the first time-domain monitoring position to obtain a plurality of second time-domain monitoring positions, and performing mapping on the first time-domain monitoring position, the plurality of second time-domain monitoring positions, and the M coresets, to form the L PDCCH search subspaces.

For example, the PDCCH search space configuration is associated with only one time-domain monitoring position but a plurality of coresets. In this case, the terminal may perform spreading on the one time-domain monitoring position to obtain time-domain monitoring positions whose quantity is the same as that of the coresets. That is, R time-domain monitoring positions (R=M) are obtained through spreading. Then, mapping is performed on the R time-domain monitoring positions obtained through spreading and the M coresets, to obtain the L PDCCH search subspaces.

In this implementation, the number of PDCCH search subspaces is determined based on the number of coresets associated with the PDCCH search space configuration, that is, L=M.

In implementation 4, M is an integer greater than 1, N=1, and the time-domain monitoring position is a first time-domain monitoring position; and the step 102 may include:

performing mapping on each coreset and the first time-domain monitoring position, to form the L PDCCH search subspaces.

In this implementation, the terminal does not perform spreading, and the PDCCH search space configuration is associated with only one time-domain monitoring position. Then, the terminal performs mapping on each coreset and the time-domain monitoring position, to form the L PDCCH search subspaces.

The number of PDCCH search subspaces is also determined based on the number of coresets associated with the PDCCH search space configuration, that is, L=M.

In implementation 5, M=1, the coreset is a first coreset, and N is an integer greater than 1; and the step 102 may include:

performing spreading on the first coreset to obtain a plurality of second coresets, and performing mapping on the first coreset, the plurality of second coresets, and the N time-domain monitoring positions, to form the L PDCCH search subspaces.

For example, the PDCCH search space configuration is associated with only one coreset and a plurality of time-domain monitoring positions. In this case, the terminal may perform spreading on the one coreset to obtain coresets whose quantity is the same as that of the time-domain monitoring positions. That is, T coresets (T=N) are obtained through spreading. Then, mapping is performed on the T coresets obtained through spreading and the N time-domain monitoring positions, so that the T coresets are in one-to-one correspondence to the N time-domain monitoring positions, to obtain the L PDCCH search subspaces.

In this implementation, the number of PDCCH search subspaces is determined based on the number of time-domain monitoring positions associated with the PDCCH search space configuration, that is, L=N.

In implementation 6, M=1, the coreset is a first coreset, and N is an integer greater than 1; and step 102 may include:

performing mapping on each time-domain monitoring position and the first coreset, to form the L PDCCH search subspaces.

In this implementation, the terminal does not perform spreading, and the PDCCH search space configuration is associated with only one coreset. Then, the terminal performs mapping on each time-domain monitoring position and the coreset, to form the L PDCCH search subspaces.

The number of PDCCH search subspaces is determined based on the number of time-domain monitoring positions associated with the PDCCH search space configuration, that is, L=N.

In implementation 7, M=1, N=1, the coreset is a first coreset, and the time-domain monitoring position is a first time-domain monitoring position; and the step 102 may include:

performing spreading on the first coreset to obtain a plurality of second coresets, and performing mapping on the first time-domain monitoring position, the first coreset, and the plurality of second coresets, to form the L PDCCH search subspaces.

For example, in a case that the PDCCH search space configuration is associated with only one coreset (the first coreset) and one time-domain monitoring position (the first time-domain monitoring position), the terminal may perform spreading on the first coreset to obtain a plurality of second coresets, and then perform mapping on the first coreset, the second coresets, and the configured first time-domain monitoring position, to form the L PDCCH search subspaces.

In implementation 8, M=1, N=1, the coreset is a first coreset, and the time-domain monitoring position is a first time-domain monitoring position; and the step 102 may include:

performing spreading on the first time-domain monitoring position to obtain a plurality of second time-domain monitoring positions, and performing mapping on the first coreset, the first time-domain monitoring position, and the plurality of second time-domain monitoring positions, to form the L PDCCH search subspaces.

For example, in a case that the PDCCH search space configuration is associated with only one coreset (the first coreset) and one time-domain monitoring position (the first time-domain monitoring position), the terminal may perform spreading on the first time-domain monitoring position to obtain a plurality of second time-domain monitoring positions, and then perform mapping on the first time-domain monitoring position, the second time-domain monitoring position, and the configured first coreset, to form the L PDCCH search subspaces.

In implementation 9, M=1, N=1, the coreset is a first coreset, and the time-domain monitoring position is a first time-domain monitoring position; and the step 102 may include:

performing spreading on the first coreset to obtain a plurality of second coresets, performing spreading on the first time-domain monitoring position to obtain a plurality of second time-domain monitoring positions, and performing mapping on the first coreset, the plurality of second coresets, the first time-domain monitoring position, and the plurality of second time-domain monitoring positions, to form the L PDCCH search subspaces.

For example, in a case that the PDCCH search space configuration is associated with only one coreset (the first coreset) and one time-domain monitoring position (the first time-domain monitoring position), the terminal may perform spreading on the first coreset and the first time-domain monitoring position to obtain a plurality of second coresets and a plurality of second time-domain monitoring positions respectively; and then perform mapping on the first coreset, the plurality of second coresets, the first time-domain monitoring position, and the plurality of second time-domain monitoring positions, to form the L PDCCH search subspaces. In this implementation, the number of second coresets is the same as the number of second time-domain monitoring positions.

It should be noted that, in the foregoing implementation 5, implementation 7, and implementation 9, the performing spreading on the first coreset to obtain the plurality of second coresets may be implemented by using the following three schemes.

Scheme 1: In a case that T−1 or T active TCI state parameters are configured for a search space, substitute TC state parameters of the first coreset by the T−1 or T active TCI state parameters, to obtain T second coresets.

For example, based on the number of active TCI state parameters configured for the search space, the number of second coresets that needs to be obtained through spreading can also be determined.

For example, assuming T=3, three active TCI state parameters may be configured for the search space, and then the three active TCI state parameters substitute TCI state parameters of three copied first coresets respectively to obtain three second coresets. The terminal performs mapping on the three second coresets obtained through spreading and the time-domain monitoring position, to form at least three PDCCH search subspaces. For example, in a case that there are three time-domain monitoring positions, three or nine PDCCH search subspaces may be formed.

It should be noted that the three second coresets are different from the first coreset only in the TCI state parameter, with all other parameters (such as frequency-domain parameter, interleaving configuration, precoding cycling configuration, and aggregation parameter configuration) being the same. This scheme may be implemented in QCL (Quasi Co-Location) non-repetition mode.

Alternatively, assuming T=3, and two active TCI state parameters may be configured for the search space. In this case, the two active TCI state parameters separately substitute a TCI state parameter of the first coreset to obtain two second coresets. The terminal performs mapping on the two second coresets, the first coreset, and the time-domain monitoring position, to form at least three PDCCH search subspaces.

Scheme 2: In a case that T−1 or T frequency-domain positions or frequency-domain offsets are configured for a search space, substitute frequency-domain positions of the first coreset by the T-I or T frequency-domain positions or frequency-domain offsets, to obtain T second coresets.

For example, based on the number of frequency-domain positions or frequency-domain offsets configured for the search space, the number of second coresets that needs to be obtained through spreading can also be determined. In this scheme, T−1 or T frequency-domain positions or frequency-domain offsets configured for the search space substitute the frequency-domain position of the first coreset, to form at least T second coresets. A principle of this scheme is similar to that of scheme 1, and details are no longer described herein by using an example.

Scheme 3: In a case that the number of second coresets configured for a search space is T, perform spreading on the first coreset according to a first preset rule to obtain T second coresets.

In this scheme, the number T of second coresets that needs to be obtained through spreading has been configured for the search space, and then the terminal performs spreading on the first coreset according to the first preset rule to obtain the T second coresets.

For example, the first coreset is spread in the QCL repetition mode to obtain T second coresets, and all parameters of the T second coresets (such as frequency-domain position, interleaving configuration, precoding cycling configuration, aggregation parameter configuration, and TCI state parameters) are the same as those of the first coreset.

The performing spreading on the first coreset according to the first preset rule includes:

performing frequency-domain position continuous spreading on a frequency-domain position of the first coreset; or activating TC state parameters of the first coreset to obtain T TCI state parameters, and performing spreading on the TCI state parameters of the first coreset based on the T TCI state parameters.

For example, based on the number of second coresets configured for the search space, the number of second coresets that needs to be obtained through spreading can also be determined. Then, continuous spreading is performed on the frequency-domain position of the first coreset. Continuous spreading on the frequency-domain position may be continuous spreading performed on the frequency-domain position of the first coreset based on a specific frequency-domain periodicity and frequency-domain offset, so as to obtain the T second coresets.

Alternatively, based on the number T of second coresets configured for the search space, the TCI state parameters of the first coreset are activated to obtain T TCI state parameters, and then spreading is performed on the TCI state parameters of the first coreset based on the T TCI state parameters, for example, substituting the TCI state parameter of the first coreset, to obtain the T second coresets.

In addition, in the foregoing implementation 3, implementation 8, and implementation 9, the performing spreading on the first time-domain monitoring position to obtain a plurality of second time-domain monitoring positions includes:

in a case that the number of second time-domain monitoring positions configured for a search space is R, performing continuous spreading on the first time-domain monitoring position to obtain R second time-domain monitoring positions.

For example, based on the number R of second time-domain monitoring positions that needs to be spread and that is configured for the search space, the terminal may determine how many second time-domain monitoring positions need to be spread. The terminal may perform continuous spreading on the first time-domain monitoring position to obtain R second time-domain monitoring positions, and then perform mapping on the R second time-domain monitoring positions and the coreset, to form at least R PDCCH search subspaces.

In this embodiment of the present disclosure, the number of PDCCH search subspaces may be determined based on at least one of the following:

explicit configuration in RRC signaling;

the number M of associated coresets; and the number N of associated time-domain monitoring positions.

It can be understood that the number of PDCCH search subspaces may be explicitly configured by using radio resource control (RRC) signaling. For example, the number of coresets that needs to be spread is explicitly configured in the RRC signaling, or the number of time-domain monitoring positions that needs to be spread is explicitly configured in the RRC signaling.

Alternatively, the number of PDCCH search subspaces may be determined based on the number M of coresets associated with the PDCCH search space configuration. For example, the PDCCH search space configuration is associated with three coresets, and in a case that spreading is not performed on the coreset, it can be determined that three PDCCH search subspaces need to be formed.

Alternatively, the number of PDCCH search subspaces may be determined based on the number N of time-domain monitoring positions associated with the PDCCH search space configuration. For example, the PDCCH search space configuration is associated with six time-domain monitoring positions, and in a case that spreading is not performed on the time-domain monitoring position, it can be determined that six PDCCH search subspaces need to be formed.

Step 103: Receive a PDCCH in the L PDCCH search subspaces.

L is an integer greater than 1, that is, the terminal can form at least two PDCCH search subspaces.

In this embodiment of the present disclosure, the step 103 may include:

receiving the PDCCH in the L PDCCH search subspaces based on first assumption content, where the first assumption content includes at least one of the following:

assuming that a PDCCH is sent in each PDCCH search subspace;

assuming that candidate PDCCH mapping is independently performed in each PDCCH search subspace;

assuming that a PDCCH sent in each PDCCH search subspace has a same preset parameter;

assuming that a PDCCH precoding cycling status in each PDCCH search subspace is prescribed by a protocol or configured by using RRC;

assuming that the number of blind decodings (BDs) used in calculating the PDCCH search space is a function of the number of BDs on at least one PDCCH search subspace; and assuming that the number of control channel elements (CCEs) used in calculating the PDCCH search space is a function of the number of CCEs on at least one PDCCH search subspace.

In some embodiments, the first assumption content includes: assuming that a PDCCH is sent in each PDCCH search subspace, that is, PDCCHs are sent in all the L PDCCH search subspaces, the terminal can perform PDCCH reception on each of the L PDCCH search subspaces.

Alternatively, the first assumption content includes: assuming that candidate PDCCH mapping is independently performed in each PDCCH search subspace, that is, candidate PDCCH mapping is independently performed in each of the L PDCCH search subspaces to map to the terminal. This ensures that the terminal can perform PDCCH reception in the L PDCCH search subspaces.

Alternatively, the first assumption content includes: assuming that the PDCCH sent in each PDCCH search subspace has a same preset parameter, and the preset parameter includes at least one of the following: a frequency-domain position, a control channel element (CCE) index, an aggregation level, a demodulation reference signal DM-RS (dedicated demodulation reference signal) scrambling code, and PDCCH content. For example, assuming that the PDCCH sent in each PDCCH search subspace has a same frequency-domain position, the terminal performs PDCCH reception in the L PDCCH search subspaces with the same frequency-domain position.

Alternatively, the first assumption content includes: assuming that the PDCCH precoding cycling status on each PDCCH search subspace is prescribed by the protocol or configured by using RRC, for example, precoding cycling statuses of the L PDCCH search subspaces received by the terminal are configured based on the RRC, and the terminal performs PDCCH reception in the L PDCCH search subspaces.

Alternatively, the first assumption content includes: assuming that the number of BD used in calculating the PDCCH search space is a function of the number of BDs in at least one PDCCH search subspace. For example, a BD of a first coreset and/or a first time-domain monitoring position corresponding to a first PDCCH search subspace is selected for calculating a BD of the PDCCH search space; or a maximum value, a minimum value, an average value, a sum value of BDs of all coresets and/or all time-domain monitoring position corresponding to all PDCCH search subspaces is selected for calculating the BD of the PDCCH search space.

Alternatively, the first assumption content includes: assuming that the number of CCEs used in calculating the PDCCH search space is a function of the number of CCEs on at least one PDCCH search subspace. For example, a CCE of a first coreset and/or a first time-domain monitoring position corresponding to a first PDCCH search subspace is selected for calculating a CCE of the PDCCH search space; or a maximum value, a minimum value, an average value, a sum value of CCEs of all coresets and/or all time-domain monitoring position corresponding to all PDCCH search subspaces is selected for calculating the CCE of the PDCCH search space.

Alternatively, the first assumption content may include a plurality of assumptions in the foregoing assumptions. For example, the first assumption content includes: assuming that a PDCCH is sent in each PDCCH search subspace, and assuming that the PDCCH precoding cycling status in each PDCCH search subspace is prescribed by the protocol or configured by using RRC. The first assumption content may alternatively be a combination of other assumption content, and details are not repeated herein.

In this embodiment of the present disclosure, after the step 103, the method may further include:

receiving a physical downlink shared channel (PDSCH), where the PDSCH is a PDSCH scheduled by a PDCCH sent in the L PDCCH search subspaces.

That is, after performing PDCCH reception in the L PDCCH search subspaces, the terminal can also perform PDSCH reception.

In some embodiments, the receiving a PDSCH includes: receiving the PDSCH based on second assumption content, where the second assumption content includes at least one of the following:

assuming that at least one of new data indicator (NDI), transport block (TB) size, and TB content of PDSCHs that are scheduled by PDCCHs sent in the L PDCCH search subspaces is the same;

assuming that hybrid automatic repeat request (HARQ) identifiers of the PDSCHs that are scheduled by the PDCCHs sent in the L PDCCH search subspaces are the same;

assuming that the HARQ identifiers of the PDSCHs that are scheduled by the PDCCHs sent in the L PDCCH search subspaces are associated with each other;

assuming that time-frequency resources of the PDSCHs that are scheduled by the PDCCHs sent in the L PDCCH search subspaces are the same;

assuming that TCI states of the PDSCHs scheduled by the PDCCHs sent in the L PDCCH search subspaces are associated with each other;

assuming that transport layers of the PDSCHs that are scheduled by the PDCCHs sent in the L PDCCH search subspaces are associated with each other; and assuming that related time-domain factors of the PDSCHs that are scheduled by the PDCCHs sent in the L PDCCH search subspaces are calculated with reference to a reference time-domain position, where the reference time-domain position is the last symbol in one of the M coresets or a slot to which the last symbol belongs.

For example, the terminal may assume that the TB content and TB size of the PDSCHs that are scheduled by the PDCCHs sent in the L PDCCH search subspaces are the same, and based on this assumption content, the terminal performs PDSCH reception in the L PDCCH search subspaces.

It should be noted that, assuming that TCI states of the PDSCHs scheduled by the PDCCHs sent in the L PDCCH search subspaces are associated with each other may be that TCI state parameters of the PDSCHs scheduled by the PDCCHs sent in the L PDCCH search subspaces are in correspondence to TCI state parameters of corresponding coresets and/or time-domain monitoring positions, and the correspondence may be prescribed by the protocol or configured by using RRC signaling.

In addition, assuming that transport layers of the PDSCHs that are scheduled by the PDCCHs sent in the L PDCCH search subspaces are associated with each other may be that layer information of the PDSCHs scheduled by the PDCCHs sent in the L PDCCH search subspaces is in correspondence to corresponding coresets and/or time-domain monitoring positions.

The foregoing assumption that related time-domain factors of the PDSCHs scheduled by the PDCCHs sent in the L PDCCH search subspaces are calculated with reference to a reference time-domain position may be that the terminal selects a specific coreset of the M coresets to calculate related time-domain factors (for example, K0, K1, or K2) of a time line, for example, selecting the last symbol in one of the M coresets or a slot to which the last symbol belongs as a reference time point for calculation.

In some embodiments, the second assumption content may include a plurality of assumptions in the foregoing assumptions, for example, the terminal may assume that the HARQ identifiers of the PDSCHs scheduled by the PDCCHs sent in the L PDCCH search subspaces are the same and/or associated with each other. The second assumption content may alternatively be a combination of other assumption content, and details are not repeated herein.

The following describes the PDCCH configuration method provided by the embodiments of the present disclosure by using two exemplary implementations.

Implementation 1: The PDCCH search space configuration received by the terminal or user equipment (UE) is associated with one coreset (M=1), a QCL repetition mode is configured or pre-defined, and the number of coresets in the PDCCH search subspace is R. In this case, all parameters (including TCI state parameters) of the R associated coresets are the same. Assuming that a time-domain starting symbol of the configured PDCCH search subspace is S and the number of symbols of the coreset is L, the starting symbols of the R coresets are S+i*L.

The UE performs PDCCH reception on the PDCCH search subspace based on one or more of the following assumptions:

the UE assumes that a PDCCH is sent in each PDCCH search subspace;

the UE assumes that candidate PDCCH mapping is independently performed in each PDCCH search subspace;

the UE assumes that a PDCCH sent in each PDCCH search subspace has the same frequency-domain position, aggregation level, DM-RS scrambling, and PDCCH content; and the UE assumes that PDCCH precoding cycling in different PDCCH search subspaces is the same.

The UE performs PDSCH reception on the PDCCH search subspace based on one or more of the following assumptions:

the UE assumes that PDSCHs scheduled by PDCCHs sent in different PDCCH search subspaces have a same TB size and content;

the UE assumes that PDSCHs scheduled by PDCCHs sent in different PDCCH search subspaces have a same time-frequency resource: and the UE assumes that PDSCHs scheduled by PDCCHs sent in different PDCCH search subspaces have a same TCI state parameter.

Implementation 2: The PDCCH search space configuration received by the UE is associated with one coreset, a QCL non-repetition mode is configured or pre-defined, the time-domain position corresponding to each coreset is configured with one time-domain offset group (t1, t2, . . . , tN), and the number of time-domain offset groups is N. In this case, the number of coresets that is implicitly obtained through spreading for the PDCCH search subspace spreading is N+1. Assuming that a time-domain starting symbol of the configured PDCCH search subspace is S and the number of symbols of the coreset is L, the starting symbols of the M associated coresets are (S, S+t1, . . . , S+tN). N+1 needs to be less than or equal to the number of active TCI state parameters of the coreset, and the first N+1 TCI state parameters are TCI state parameters corresponding to each coreset.

The UE performs PDCCH reception on the PDCCH search subspace based on one or more of the following assumptions:

the UE assumes that a PDCCH is sent in each PDCCH search subspace;

the UE assumes that candidate PDCCH mapping is independently performed in each PDCCH search subspace;

the UE assumes that a PDCCH sent in each PDCCH search subspace has the same frequency-domain position, aggregation level, DM-RS scrambling, and PDCCH content; and the UE assumes that PDCCH precoding cycling in different PDCCH search subspaces is the same.

The UE performs PDSCH reception on the PDCCH search subspace based on one or more of the following assumptions:

the UE assumes that PDSCHs scheduled by PDCCHs sent in different PDCCH search subspaces have a same TB size and content;

the UE assumes that PDSCHs scheduled by PDCCHs sent in different PDCCH search subspaces have a same time-frequency resource; and the UE assumes that there is a specific correspondence between transport-layer layer information of PDSCHs scheduled by the PDCCHs sent in different PDCCH search subspaces and the coreset.

In the PDCCH configuration method provided by this embodiment of the present disclosure, the terminal receives the PDCCH search space configuration, and the PDCCH search space configuration is associated with M coresets and N time-domain monitoring positions, so that the terminal forms L PDCCH search subspaces based on the M coresets and N time-domain monitoring positions, and performs PDCCH reception in the L PDCCH search subspaces, where M and N are both integers greater than or equal to 1, and L is an integer greater than 1.

In this way, compared with an existing PDCCH search space configuration for which only one coreset and one time-domain monitoring position are configured to form only one PDCCH search subspace for PDCCH reception, in this solution provided by this embodiment of the present disclosure, the number of coresets and that of time-domain monitoring positions associated with the PDCCH search space configuration are at least one, and at least two PDCCH search subspaces can be formed, so that the terminal can implement PDCCH reception in the at least two PDCCH search subspaces, thereby improving PDCCH transmission performance and further improving PDCCH reception performance of the terminal.

Figure 2:
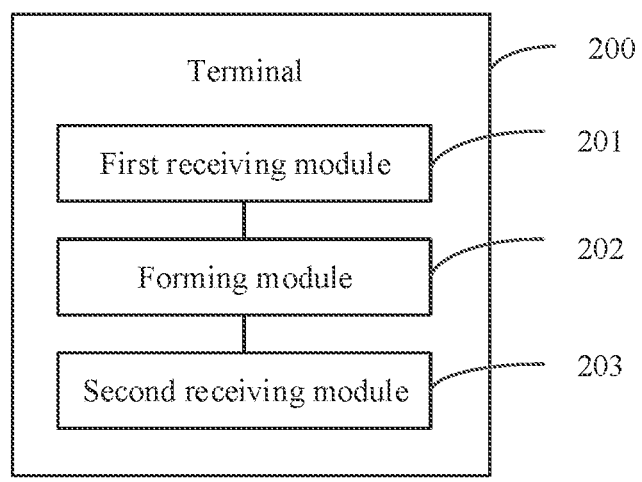
FIG. 2 is a structural diagram of a terminal according to an embodiment of the present disclosure.

An embodiment of the present disclosure further provides a terminal. Referring to FIG. 2, the terminal 200 includes:

a first receiving module 201, configured to receive a PDCCH search space configuration, where the PDCCH search space configuration is associated with M control resource sets coresets and N time-domain monitoring positions;

a forming module 202, configured to form L PDCCH search subspaces based on the M coresets and the N time-domain monitoring positions, where one PDCCH search subspace includes one coreset and one time-domain monitoring position; and a second receiving module 203, configured to receive a PDCCH in the L PDCCH search subspaces; where M and N are both integers greater than or equal to 1, and L is an integer greater than 1.

In some embodiments, M and N are both integers greater than 1; and the forming module 202 is further configured to:

perform mapping on the M coresets and the N time-domain monitoring positions to form the L PDCCH search subspaces; or perform spreading and mapping on the M coresets and/or the N time-domain monitoring positions to form the L PDCCH search subspaces.

In some embodiments, M is an integer greater than 1, N=1, and the time-domain monitoring position is a first time-domain monitoring position; and the forming module 202 is further configured to:

perform spreading on the first time-domain monitoring position to obtain a plurality of second time-domain monitoring positions, and performing mapping on the first time-domain monitoring position, the plurality of second time-domain monitoring positions, and the M coresets, to form the L PDCCH search subspaces; or perform mapping on each coreset and the first time-domain monitoring position, to form the L PDCCH search subspaces.

In some embodiments, M=1, the coreset is a first coreset, and N is an integer greater than 1; and the forming module 202 is further configured to:

perform spreading on the first coreset to obtain a plurality of second coresets, and performing mapping on the first coreset, the plurality of second coresets, and the N time-domain monitoring positions, to form the L PDCCH search subspaces; or perform mapping on each time-domain monitoring position and the first coreset, to form the L PDCCH search subspaces.

In some embodiments, M=1, N=1, the coreset is a first coreset, and the time-domain monitoring position is a first time-domain monitoring position; and the forming module 202 is further configured to:

perform spreading on the first coreset to obtain a plurality of second coresets, and perform mapping on the first time-domain monitoring position, the first coreset, and the plurality of second coresets, to form the L PDCCH search subspaces; or perform spreading on the first time-domain monitoring position to obtain a plurality of second time-domain monitoring positions, and perform mapping on the first coreset, the first time-domain monitoring position, and the plurality of second time-domain monitoring positions, to form the L PDCCH search subspaces; or perform spreading on the first coreset to obtain a plurality of second coresets, perform spreading on the first time-domain monitoring position to obtain a plurality of second time-domain monitoring positions, and perform mapping on the first coreset, the plurality of second coresets, the first time-domain monitoring position, and the plurality of second time-domain monitoring positions, to form the L PDCCH search subspaces.

In some embodiments, the forming module 202 is further configured to:

in a case that T−1 or T active transmission configuration indicator TCI state parameters are configured for a search space, substitute TCI state parameters of the first coreset by the T−1 or T active TCI state parameters, to obtain T second coresets; or in a case that T−1 or T frequency-domain positions or frequency-domain offsets are configured for a search space, substitute frequency-domain positions of the first coreset by the T−1 or T frequency-domain positions or frequency-domain offsets, to obtain T second coresets; or in a case that the number of second coresets configured for a search space is T, perform spreading on the first coreset according to a first preset rule to obtain T second coresets.

In some embodiments, the forming module 202 is further configured to:

perform frequency-domain position continuous spreading on a frequency-domain position of the first coreset; or activate TC state parameters of the first coreset to obtain T TCI state parameters, and perform spreading on the TCI state parameters of the first coreset based on the T TCI state parameters.

In some embodiments, the forming module 202 is further configured to:

in a case that the number of second time-domain monitoring positions configured for a search space is R, perform continuous spreading on the first time-domain monitoring position to obtain R second time-domain monitoring positions.

In some embodiments, a quantity of the M coresets is determined based on at least one of the following:

the PDCCH search space configuration includes a coreset group, and the coreset group includes M coreset IDs;

the PDCCH search space configuration is associated with one coreset ID and includes M activated TCI state parameters; and the PDCCH search space configuration is associated with one coreset ID and includes M frequency-domain positions.

In some embodiments, a quantity of the N time-domain monitoring positions is determined based on at least one of the following:

the PDCCH search space configuration includes N independently configured time-domain monitoring positions; and the PDCCH search space configuration includes one independently configured time-domain monitoring position and N or N−1 time-domain offset groups.

In some embodiments, a quantity of the PDCCH search subspaces is determined based on at least one of the following:

explicit configuration in radio resource control RRC signaling;

the number M of associated coresets; and the number N of associated time-domain monitoring positions.

In some embodiments, the second receiving module 203 is further configured to:

receiving the PDCCH in the L PDCCH search subspaces based on first assumption content, where the first assumption content includes at least one of the following:

assuming that a PDCCH is sent in each PDCCH search subspace;

assuming that candidate PDCCH mapping is independently performed in each PDCCH search subspace;

assuming that a PDCCH sent in each PDCCH search subspace has a same preset parameter;

assuming that a PDCCH precoding cycling status in each PDCCH search subspace is prescribed by a protocol or configured by using RRC;

assuming that the number of BDs used in calculating the PDCCH search space is a function of the number of BDs on at least one PDCCH search subspace; and assuming that the number of CCEs used in calculating the PDCCH search space is a function of the number of CCEs on at least one PDCCH search subspace.

In some embodiments, the preset parameter includes at least one of the following: frequency-domain position, CCE index, aggregation level, demodulation reference signal DM-RS scrambling code, and PDCCH content.

In some embodiments, the terminal 200 further includes:

a third receiving module, configured to receive a physical downlink shared channel PDSCH, where the PDSCH is a PDSCH scheduled by a PDCCH sent in the L PDCCH search subspaces.

In some embodiments, the third receiving module is further configured to:

receive the PDSCH based on second assumption content, where the second assumption content includes at least one of the following:

assuming that at least one of NDI, TB size, and TB content of PDSCHs that are scheduled by PDCCHs sent in the L PDCCH search subspaces is the same;

assuming that hybrid automatic repeat request HARQ identifiers of the PDSCHs that are scheduled by the PDCCHs sent in the L PDCCH search subspaces are the same;

assuming that the HARQ identifiers of the PDSCHs that are scheduled by the PDCCHs sent in the L PDCCH search subspaces are associated with each other;

assuming that time-frequency resources of the PDSCHs that are scheduled by the PDCCHs sent in the L PDCCH search subspaces are the same;

assuming that TCI states of the PDSCHs scheduled by the PDCCHs sent in the L PDCCH search subspaces are associated with each other;

assuming that transport layers of the PDSCHs that are scheduled by the PDCCHs sent in the L PDCCH search subspaces are associated with each other; and assuming that related time-domain factors of the PDSCHs that are scheduled by the PDCCHs sent in the L PDCCH search subspaces are calculated with reference to a reference time-domain position, where the reference time-domain position is the last symbol in one of the M coresets or a slot to which the last symbol belongs.

It should be noted that this embodiment is an implementation of an apparatus corresponding to the PDCCH configuration method embodiment shown in FIG. 1. For the exemplary implementation, reference may be made to the related description of the embodiment shown in FIG. 1. To avoid repeated descriptions, details are not repeated in this embodiment.

After receiving the PDCCH search space configuration, the terminal 200 provided in this embodiment can form the L PDCCH search subspaces based on the M coresets and the N time-domain monitoring positions, and receive the PDCCH in the L PDCCH search subspaces; where both M and N are integers greater than or equal to 1, and L is an integer greater than 1. In this way, at least one coreset and at least one time-domain monitoring position are associated with the PDCCH search space configuration, and at least two PDCCH search subspaces can be formed, so that the terminal can perform PDCCH reception on the at least two PDCCH search subspaces, thereby improving PDCCH reception performance of the terminal.

Figure 3:
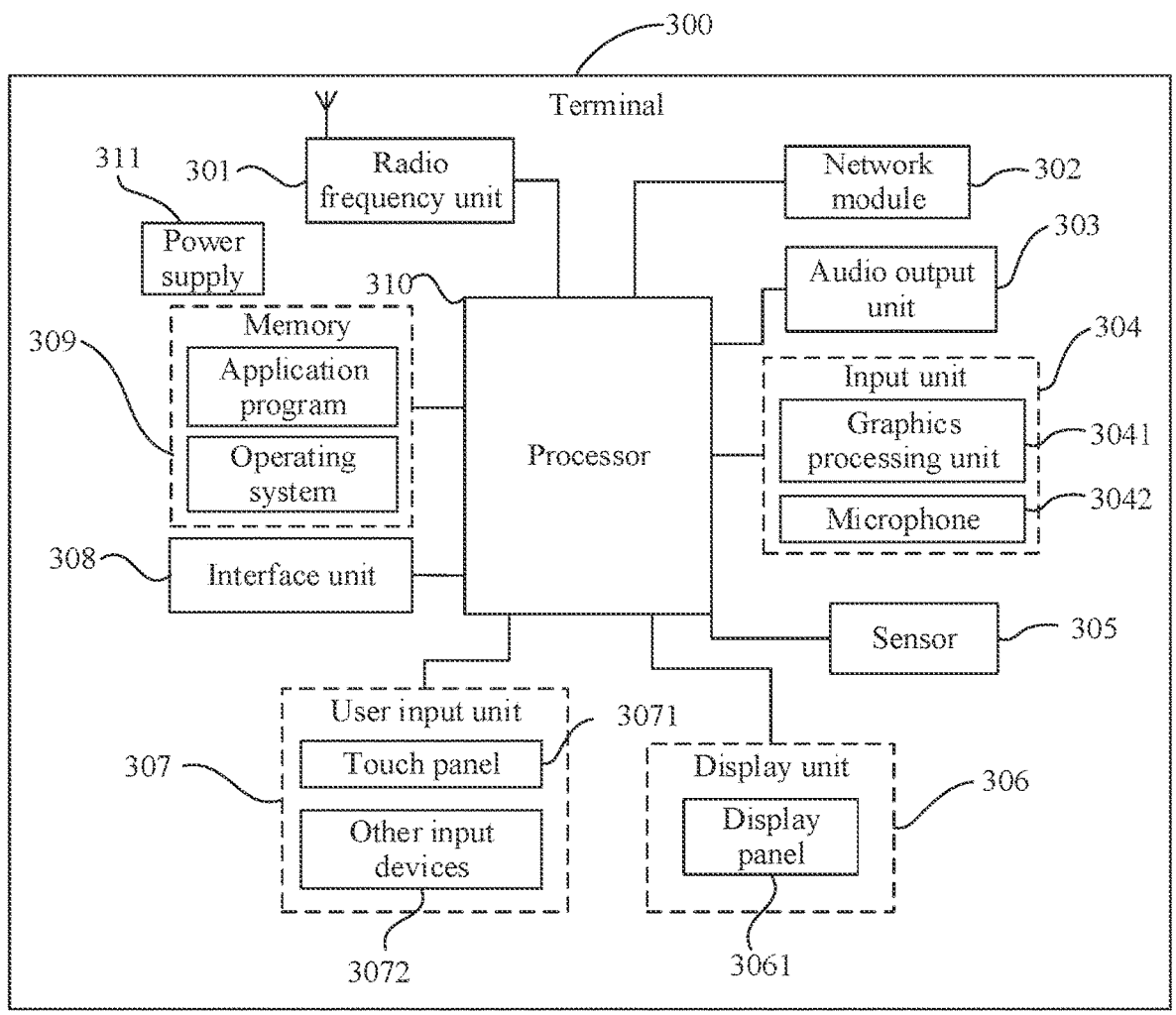
FIG. 3 is a structural diagram of another terminal according to an embodiment of the present disclosure.

An embodiment of the present disclosure further provides another terminal. Referring to FIG. 3, the terminal 300 is capable of implementing the processes of the PDCCH configuration method embodiment shown in FIG. 1, with the same technical effects achieved. As shown in FIG. 3, the terminal 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art may understand that the structure of the terminal shown in FIG. 3 does not constitute any limitation on the terminal. The terminal may include more or fewer components than those shown in the figure, or a combination of some components, or the components disposed differently. In this embodiment of the present disclosure, the terminal includes, but is not limited to, a mobile phone, a tablet computer, a laptop computer, a personal digital assistant, an in-vehicle terminal, a wearable device, a pedometer, and the like.

The radio frequency unit 301 is configured to receive a PDCCH search space configuration, where the PDCCH search space configuration is associated with M control resource sets coresets and N time-domain monitoring positions.

The processor 310 is configured to form L PDCCH search subspaces based on the M coresets and the N time-domain monitoring positions, where one PDCCH search subspace includes one coreset and one time-domain monitoring position.

The radio frequency unit 301 is further configured to receive a PDCCH in the L PDCCH search subspaces; where M and N are both integers greater than or equal to 1, and L is an integer greater than 1.

In some embodiments, M and N are both integers greater than 1; and the processor 310 is configured to:

perform mapping on the M coresets and the N time-domain monitoring positions to form the L PDCCH search subspaces; or perform spreading and mapping on the M coresets and/or the N time-domain monitoring positions to form the L PDCCH search subspaces.

In some embodiments, M is an integer greater than 1, N=1, and the time-domain monitoring position is a first time-domain monitoring position; and the processor 310 is further configured to:

perform spreading on the first time-domain monitoring position to obtain a plurality of second time-domain monitoring positions, and performing mapping on the first time-domain monitoring position, the plurality of second time-domain monitoring positions, and the M coresets, to form the L PDCCH search subspaces; or perform mapping on each coreset and the first time-domain monitoring position, to form the L PDCCH search subspaces.

In some embodiments, M=1, the coreset is a first coreset, and N is an integer greater than 1; and the processor 310 is further configured to:

perform spreading on the first coreset to obtain a plurality of second coresets, and performing mapping on the first coreset, the plurality of second coresets, and the N time-domain monitoring positions, to form the L PDCCH search subspaces; or perform mapping on each time-domain monitoring position and the first coreset, to form the L PDCCH search subspaces.

In some embodiments, M=1, N=1, the coreset is a first coreset, and the time-domain monitoring position is a first time-domain monitoring position; and the processor 310 is further configured to:

perform spreading on the first coreset to obtain a plurality of second coresets, and perform mapping on the first time-domain monitoring position, the first coreset, and the plurality of second coresets, to form the L PDCCH search subspaces; or perform spreading on the first time-domain monitoring position to obtain a plurality of second time-domain monitoring positions, and perform mapping on the first coreset, the first time-domain monitoring position, and the plurality of second time-domain monitoring positions, to form the L PDCCH search subspaces; or perform spreading on the first coreset to obtain a plurality of second coresets, perform spreading on the first time-domain monitoring position to obtain a plurality of second time-domain monitoring positions, and perform mapping on the first coreset, the plurality of second coresets, the first time-domain monitoring position, and the plurality of second time-domain monitoring positions, to form the L PDCCH search subspaces.

In some embodiments, the processor 310 is further configured to:

in a case that T−1 or T active transmission configuration indicator TCI state parameters are configured for a search space, substitute TCI state parameters of the first coreset by the T−1 or T active TCI state parameters, to obtain T second coresets; or in a case that T−1 or T frequency-domain positions or frequency-domain offsets are configured for a search space, substitute frequency-domain positions of the first coreset by the T−1 or T frequency-domain positions or frequency-domain offsets, to obtain T second coresets; or in a case that the number of second coresets configured for a search space is T, perform spreading on the first coreset according to a first preset rule to obtain T second coresets.

In some embodiments, the processor 310 is further configured to:

perform frequency-domain position continuous spreading on a frequency-domain position of the first coreset; or activate TCI state parameters of the first coreset to obtain T TCI state parameters, and perform spreading on the TCI state parameters of the first coreset based on the T TCI state parameters.

In some embodiments, the processor 310 is further configured to:

in a case that the number of second time-domain monitoring positions configured for a search space is R, perform continuous spreading on the first time-domain monitoring position to obtain R second time-domain monitoring positions.

In some embodiments, a quantity of the M coresets is determined based on at least one of the following:

the PDCCH search space configuration includes a coreset group, and the coreset group includes M coreset IDs;

the PDCCH search space configuration is associated with one coreset ID and includes M activated TCI state parameters; and the PDCCH search space configuration is associated with one coreset ID and includes M frequency-domain positions.

In some embodiments, a quantity of the N time-domain monitoring positions is determined based on at least one of the following:

the PDCCH search space configuration includes N independently configured time-domain monitoring positions; and the PDCCH search space configuration includes one independently configured time-domain monitoring position and N or N−1 time-domain offset groups.

In some embodiments, a quantity of the PDCCH search subspaces is determined based on at least one of the following:

explicit configuration in radio resource control RRC signaling;

the number M of associated coresets; and the number N of associated time-domain monitoring positions.

In some embodiments, the radio frequency unit 301 is further configured to:

receive the PDCCH in the L PDCCH search subspaces based on first assumption content, where the first assumption content includes at least one of the following:

assuming that a PDCCH is sent in each PDCCH search subspace;

assuming that candidate PDCCH mapping is independently performed in each PDCCH search subspace;

assuming that a PDCCH sent in each PDCCH search subspace has a same preset parameter;

assuming that a PDCCH precoding cycling status in each PDCCH search subspace is prescribed by a protocol or configured by using RRC;

assuming that the number of BDs used in calculating the PDCCH search space is a function of the number of BDs on at least one PDCCH search subspace; and assuming that the number of CCEs used in calculating the PDCCH search space is a function of the number of CCEs on at least one PDCCH search subspace.

In some embodiments, the preset parameter includes at least one of the following:

frequency-domain position, CCE index, aggregation level, demodulation reference signal DM-RS scrambling code, and PDCCH content.

In some embodiments, the radio frequency unit 301 is further configured to:

receive a physical downlink shared channel PDSCH, where the PDSCH is a PDSCH scheduled by a PDCCH sent in the L PDCCH search subspaces.

In some embodiments, the radio frequency unit 301 is further configured to:

receive the PDSCH based on second assumption content, where the second assumption content includes at least one of the following:

assuming that at least one of NDI, TB size, and TB content of PDSCHs that are scheduled by PDCCHs sent in the L PDCCH search subspaces is the same;

assuming that hybrid automatic repeat request HARQ identifiers of the PDSCHs that are scheduled by the PDCCHs sent in the L PDCCH search subspaces are the same;

assuming that the HARQ identifiers of the PDSCHs that are scheduled by the PDCCHs sent in the L PDCCH search subspaces are associated with each other;

assuming that time-frequency resources of the PDSCHs that are scheduled by the PDCCHs sent in the L PDCCH search subspaces are the same;

assuming that TCI states of the PDSCHs scheduled by the PDCCHs sent in the L PDCCH search subspaces are associated with each other;

assuming that transport layers of the PDSCHs that are scheduled by the PDCCHs sent in the L PDCCH search subspaces are associated with each other; and assuming that related time-domain factors of the PDSCHs that are scheduled by the PDCCHs sent in the L PDCCH search subspaces are calculated with reference to a reference time-domain position, where the reference time-domain position is the last symbol in one of the M coresets or a slot to which the last symbol belongs.

After receiving the PDCCH search space configuration, the terminal 300 provided in this embodiment of the present disclosure can form the L PDCCH search subspaces based on the M coresets and the N time-domain monitoring positions, and receive the PDCCH in the L PDCCH search subspaces; where both M and N are integers greater than or equal to 1, and L is an integer greater than 1. In this way, at least one coreset and at least one time-domain monitoring position are associated with the PDCCH search space configuration, and at least two PDCCH search subspaces can be formed, so that the terminal can perform PDCCH reception on the at least two PDCCH search subspaces, thereby improving PDCCH reception performance of the terminal 300.

It should be understood that in this embodiment of the present disclosure, the radio frequency unit 301 may be configured to: receive and send signals in an information receiving/sending process or a call process; and for example, after receiving downlink data from abase station, send the downlink information to the processor 310 for processing, and in addition, send uplink data to the base station. Generally, the radio frequency unit 301 includes, but is not limited to, an antenna, at least one amplifier, a transceiver, a coupler, a low noise amplifier, a duplexer, and the like. In addition, the radio frequency unit 301 may also communicate with a network and other devices via a wireless communications system.

The terminal 300 provides a user with wireless broadband internet access through the network module 302, for example, helping the user to transmit and receive e-mails, browse web pages, and access streaming media.

The audio output unit 303 may convert audio data received by the radio frequency unit 301 or the network module 302 or stored in the memory 309 into an audio signal and output the audio signal as a sound. Furthermore, the audio output unit 303 may also provide audio output (for example, a call signal received sound or a message received sound) related to a function performed by the terminal 300. The audio output unit 303 includes a speaker, a buzzer, a receiver, and the like.

The input unit 304 is configured to receive an audio or video signal. The input unit 304 may include a graphics processing unit (GPU) 3041 and a microphone 3042. The graphics processing unit 3041 processes image data of a still picture or video obtained by an image capture apparatus (such as a camera) in a video capture mode or an image capture mode. A processed image frame may be displayed on the display unit 306. The image frame processed by the graphics processing unit 3041 may be stored in the memory 309 (or another computer-readable storage medium) or be sent by the radio frequency unit 301 or the network module 302. The microphone 3042 is capable of receiving sounds and processing such sounds into audio data. The processed audio data may be converted in a telephone call mode into a format that can be transmitted by the radio frequency unit 301 to a mobile communications base station, for outputting.

The terminal 300 may further include at least one sensor 305, for example, an optical sensor, a motion sensor, and another sensor. For example, the optical sensor may include an ambient light sensor and a proximity sensor. The ambient light sensor may adjust luminance of the display panel 3031 based on brightness of ambient light, and the proximity sensor may turn off the display panel 3031 and/or backlight when the terminal 300 moves close to an ear. As a motion sensor, an accelerometer sensor may detect the magnitude of acceleration in each direction (generally three axes), and in a stationary state, may detect the magnitude and direction of gravity, and may be used to recognize terminal postures (for example, shift between a landscape orientation and a portrait orientation, related games, and magnetometer posture calibration), and vibration recognition-related functions (such as a pedometer and knocking), and the like. The sensor 305 may further include a fingerprint sensor, a pressure sensor, an iris sensor, a molecular sensor, a gyroscope, a barometer, a hygrometer, a thermometer, an infrared sensor, and the like. Details are not described herein again.

The display unit 306 is configured to display information input by the user or information provided to the user. The display unit 306 may include a display panel 3031, and the display panel 3031 may be configured in a form of a liquid crystal display (LCD), an organic light-emitting diode (OLED), or the like.

The user input unit 307 may be configured to: receive a digit or character information that is input, and generate signal input related to user settings and function control of the terminal 300. For example, the user input unit 307 may include a touch panel 3071 and other input devices 3072. The touch panel 3071 is also referred to as a touchscreen and can collect a touch operation (such as an operation performed by the user on the touch panel 3071 or near the touch panel 3071 with a finger or by using any proper object or accessory such as a stylus) of the user on or near the touch panel 3071. The touch panel 3071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 310, and can receive a command transmitted by the processor 310 and execute the command. In addition, the touch panel 3071 may be implemented in a plurality of forms, for example, as a resistive, capacitive, infrared, or surface acoustic wave touch panel. In addition to the touch panel 3071, the user input unit 307 may further include other input devices 3072. For example, the other input devices 3072 may include but are not limited to a physical keyboard, a function key (such as a volume control key or an on/off key), a trackball, a mouse, and a joystick. Details are not described herein.

Further, the touch panel 3071 may cover the display panel 3031. When detecting a touch operation on or near the touch panel 3071, the touch panel 3071 transmits the touch operation to the processor 310 to determine a type of a touch event. Then, the processor 310 provides a corresponding visual output on the display panel 3031 based on the type of the touch event. In FIG. 3, the touch panel 3071 and the display panel 3031 serve as two independent components to implement input and output functions of the terminal 300. In some embodiments, however, the touch panel 3071 may be integrated with the display panel 3031 to implement the input and output functions of the terminal 300. This is not specifically limited herein.

The interface unit 308 is an interface between an external apparatus and the terminal 300. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 308 may be configured to: receive input (for example, data information and power) from the external apparatus, and transmit the received input to one or more elements in the terminal 300, or may be configured to transmit data between the terminal 300 and the external apparatus.

The memory 309 may be configured to store software programs and various data. The memory 309 may primarily include a program storage area and a data storage area. The program storage area may store an operating system, an application (such as an audio play function and an image play function) required by at least one function, and the like. The data storage area may store data (such as audio data and a phone book) created based on the use of the mobile phone. In addition, the memory 309 may include a high-speed random access memory, and may further include a non-volatile memory such as at least one disk storage device, a flash memory device, or another volatile solid-state storage device.

The processor 310 is a control center of the terminal 300. The processor 310 uses various interfaces and lines to connect all parts of the entire terminal 300, and performs various functions and data processing of the terminal 300 by running or executing the software program and/or module stored in the memory 309 and invoking data stored in the memory 309, thereby performing overall monitoring on the terminal 300. The processor 310 may include one or more processing units. For example, the processor 310 may integrate an application processor and a modem processor. The application processor mainly processes the operating system, a user interface, an application program, and the like. The modem processor mainly processes wireless communication. It can be understood that the modem processor may alternatively be not integrated in the processor 310.

The terminal 300 may further include the power supply 311 (such as a battery) supplying power to each component. For example, the power supply 311 may be logically connected to the processor 310 by using a power management system, so that functions such as charge and discharge management and power consumption management are implemented by using the power management system.

In addition, the terminal 300 includes some functional modules that are not illustrated. Details are not described herein.

In some embodiments, an embodiment of the present disclosure further provides a terminal, including a processor, a memory, and a computer program stored in the memory and running on the processor. When the computer program is executed by the processor, the processes of the foregoing PDCCH configuration method embodiment shown in FIG. 1 can be implemented, with the same technical effects achieved. To avoid repetition, details are not described herein again.

An embodiment of the present disclosure further provides a computer-readable storage medium, where a computer program is stored in the computer-readable storage medium. When the computer program is executed by a processor, the processes of the foregoing PDCCH configuration method embodiment shown in FIG. 1 can be implemented, with the same technical effects achieved. To avoid repetition, details are not described herein again. The computer-readable storage medium is, for example, a read-only memory (ROM), a random access memory (RAM), a magnetic disk, or an optical disc.

It can be understood that the embodiments described some embodiments in this disclosure may be implemented by hardware, software, firmware, middleware, microcode, or a combination thereof. For hardware implementation, a module, a unit, a submodule, a subunit, and the like may be implemented in one or more application specific integrated circuits (ASIC), digital signal processors (DSPs), digital signal processing devices (DSPDs), programmable logic devices (PLDs), field-programmable gate arrays (FPGAs), general-purpose processors, controllers, microcontrollers, microprocessors, and other electronic units for performing the functions described in this application, or a combination thereof.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and may alternatively be implemented by using hardware. However, in most cases, the former is an exemplary implementation. Based on such an understanding, the technical solutions of the present disclosure essentially, or the part contributing to the related art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The foregoing descriptions are merely exemplary implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A physical downlink control channel (PDCCH) configuration method, performed by a terminal, the method comprising:
   receiving a PDCCH search space configuration, wherein the PDCCH search space configuration is associated with M control resource sets (coresets) and N time-domain monitoring positions, wherein the N time-domain monitoring positions are determined based on at least one of the following:
      the PDCCH search space configuration that comprises N independently configured time-domain monitoring positions, or
      the PDCCH search space configuration that comprises one independently configured time-domain monitoring position and N or N=1 time-domain offset groups;
   forming L PDCCH search subspaces based on the M coresets and the N time-domain monitoring positions, wherein one PDCCH search subspace comprises one coreset and one time-domain monitoring position; and
   receiving a PDCCH in the L PDCCH search subspaces, wherein M is an integer greater than or equal to 1, N is an integer greater than 1, and L is an integer greater than 1.

2. The PDCCH configuration method according to claim 1, wherein M is greater than 1, forming the L PDCCH search subspaces based on the M coresets and the N time-domain monitoring positions comprises:
   performing mapping on the M coresets and the N time-domain monitoring positions to form the L PDCCH search subspaces; or
   performing spreading and mapping on the M coresets or the N time-domain monitoring positions to form the L PDCCH search subspaces.

3. The PDCCH configuration method according to claim 1, wherein:
   M=1,
   the coreset is a first coreset, and
   forming the L PDCCH search subspaces based on the M coresets and the N time-domain monitoring positions comprises:
      performing spreading on the first coreset to obtain a plurality of second coresets, and performing mapping on the first coreset, the plurality of second coresets, and the N time-domain monitoring positions, to form the L PDCCH search subspaces; or performing mapping on each time-domain monitoring position and the first coreset, to form the L PDCCH search subspaces.

4. The PDCCH configuration method according to claim 3, wherein the performing spreading on the first coreset to obtain a plurality of second coresets comprises:

in a case that T−1 or T active transmission configuration indicator (TCI) state parameters are configured for a search space, substituting TC state parameters of the first coreset by the T−1 or T active TCI state parameters, to obtain T second coresets; or in a case that T−1 or T frequency-domain positions or frequency-domain offsets are configured for a search space, substituting frequency-domain positions of the first coreset by the T−1 or T frequency-domain positions or frequency-domain offsets, to obtain T second coresets; or in a case that the number of second coresets configured for a search space is T, performing spreading on the first coreset according to a first preset rule to obtain T second coresets.

5. The PDCCH configuration method according to claim 4, wherein the performing spreading on the first coreset according to a first preset rule comprises:

performing frequency-domain position continuous spreading on a frequency-domain position of the first coreset; or activating TCI state parameters of the first coreset to obtain T TCI state parameters, and performing spreading on the TCI state parameters of the first coreset based on the T TCI state parameters.

6. The PDCCH configuration method according to claim 1, wherein the M coresets are determined based on at least one of the following:

the PDCCH search space configuration that comprises a coreset group, and the coreset group comprises M coreset IDs;

the PDCCH search space configuration that is associated with one coreset ID and comprises M activated TCI state parameters; or the PDCCH search space configuration that is associated with one coreset ID and comprises M frequency-domain positions.

7. The PDCCH configuration method according to claim 1, wherein the number of PDCCH search subspaces is determined based on at least one of the following:

explicit configuration in radio resource control (RRC) signaling;

the number M of associated coresets; or the number N of associated time-domain monitoring positions.

8. The PDCCH configuration method according to claim 1, wherein the receiving a PDCCH in the L PDCCH search subspaces comprises:

receiving the PDCCH in the L PDCCH search subspaces based on first assumption content, wherein the first assumption content comprises at least one of the following:

assuming that a PDCCH is sent in each PDCCH search subspace;

assuming that candidate PDCCH mapping is independently performed in each PDCCH search subspace;

assuming that a PDCCH sent in each PDCCH search subspace has a same preset parameter;

assuming that a PDCCH precoding cycling status in each PDCCH search subspace is prescribed by a protocol or configured by using radio resource control (RRC);

assuming that the number of blind decodings (BDs) used in calculating the PDCCH search space is a function of the number of BDs on at least one PDCCH search subspace; or assuming that the number of control channel elements (CCEs) used in calculating the PDCCH search space is a function of the number of CCEs on at least one PDCCH search subspace.

9. The PDCCH configuration method according to claim 8, wherein the preset parameter comprises at least one of the following:

frequency-domain position, CCE index, aggregation level, demodulation reference signal DM-RS scrambling code, or PDCCH content.

10. The PDCCH configuration method according to claim 1, further comprising:

receiving a physical downlink shared channel (PDSCH), wherein the PDSCH is a PDSCH scheduled by a PDCCH sent in the L PDCCH search subspaces.

11. The PDCCH configuration method according to claim 10, wherein the receiving a PDSCH comprises:

receiving the PDSCH based on second assumption content, wherein the second assumption content comprises at least one of the following:

assuming that at least one of new data indicator (NDI), transport block (TB) size, and TB content of PDSCHs that are scheduled by PDCCHs sent in the L PDCCH search subspaces is the same;

assuming that hybrid automatic repeat request (HARQ) identifiers of the PDSCHs that are scheduled by the PDCCHs sent in the L PDCCH search subspaces are the same;

assuming that the HARQ identifiers of the PDSCHs that are scheduled by the PDCCHs sent in the L PDCCH search subspaces are associated with each other;

assuming that time-frequency resources of the PDSCHs that are scheduled by the PDCCHs sent in the L PDCCH search subspaces are the same;

assuming that TCI states of the PDSCHs scheduled by the PDCCHs sent in the L PDCCH search subspaces are associated with each other;

assuming that transport layers of the PDSCHs that are scheduled by the PDCCHs sent in the L PDCCH search subspaces are associated with each other; or assuming that related time-domain factors of the PDSCHs that are scheduled by the PDCCHs sent in the L PDCCH search subspaces are calculated with reference to a reference time-domain position, wherein the reference time-domain position is the last symbol in one of the M coresets or a slot to which the last symbol belongs.

12. A terminal, comprising: a processor; and a memory having a computer program stored thereon, wherein the computer program, when executed by the processor, causes the processor to perform:

receive a physical downlink control channel (PDCCH) search space configuration, wherein the PDCCH search space configuration is associated with M control resource sets (coresets) and N time-domain monitoring positions, wherein the N time-domain monitoring positions are determined based on at least one of the following:

the PDCCH search space configuration that comprises N independently configured time-domain monitoring positions, or the PDCCH search space configuration that comprises one independently configured time-domain monitoring position and N or N=1 time-domain offset groups;

form L PDCCH search subspaces based on the M coresets and the N time-domain monitoring positions, wherein one PDCCH search subspace comprises one coreset and one time-domain monitoring position; and receive a PDCCH in the L PDCCH search subspaces, wherein M is an integer greater than or equal to 1, N is an integer greater than 1, and L is an integer greater than 1.

13. The terminal according to claim 12, wherein M is greater than 1, and the processor is further configured to:

perform mapping on the M coresets and the N time-domain monitoring positions to form the L PDCCH search subspaces; or perform spreading and mapping on the M coresets or the N time-domain monitoring positions to form the L PDCCH search subspaces.

14. The terminal according to claim 11, wherein;

M=1, the coreset is a first coreset, and the processor is further configured to:

perform spreading on the first coreset to obtain a plurality of second coresets, and perform mapping on the first coreset, the plurality of second coresets, and the N time-domain monitoring positions, to form the L PDCCH search subspaces; or perform mapping on each time-domain monitoring position and the first coreset, to form the L PDCCH search subspaces.

15. A non-transitory computer-readable storage medium, wherein the non-transitory computer-readable storage medium stores a computer program, and when the computer program, executed by a processor, causes the processor to perform;

receive a physical downlink control channel (PDCCH) search space configuration, wherein the PDCCH search space configuration is associated with M control resource sets (coresets) and N time-domain monitoring positions, wherein the N time-domain monitoring positions are determined based on at least one of the following:

the PDCCH search space configuration that comprises N independently configured time-domain monitoring positions, or the PDCCH search space configuration that comprises one independently configured time-domain monitoring position and N or N−1 time-domain offset groups;

form L PDCCH search subspaces based on the M coresets and the N time-domain monitoring positions, wherein one PDCCH search subspace comprises one coreset and one time-domain monitoring position; and receive a PDCCH in the L PDCCH search subspaces, wherein is an integer greater than or equal to 1, N is an integer greater than 1 and L is an integer greater than 1.

* * * * *